Nov. 16, 1965   J. L. WINPISINGER   3,218,576
RESONANT INVERTER DRIVE CIRCUIT WITH PRECHARGING MEANS
Original Filed Sept. 12, 1962                    2 Sheets-Sheet 1

WITNESSES
Leon J. Taza
James F. Young

INVENTOR
Joseph L. Winpisinger
BY John L. Houghton
ATTORNEY

3,218,576
RESONANT INVERTER DRIVE CIRCUIT WITH
PRECHARGING MEANS
Joseph L. Winpisinger, Fairview Park, Ohio, assignor to
Westinghouse Electric Corporation, East Pittsburgh,
Pa., a corporation of Pennsylvania
Continuation of application Ser. No. 223,231, Sept. 12,
1962. This application Nov. 23, 1964, Ser. No. 414,519
4 Claims. (Cl. 331—113)

This invention is a continuation of my copending application Serial No. 223,231, filed September 12, 1962, for Inverter Drive Circuit, now abandoned, which application was a continuation-in-part of my application Serial No. 2,159, filed January 13, 1960, for Inverter Drive Circuit, now abandoned. It relates generally to transistor controlled inverters and more particularly to an improved base drive for such an inverter.

It is an object of this invention to provide a new and improved inverter network.

A further object is to provide such a network in which the operation thereof may be controlled by controlling the energization of the base drive circuit as contrasted to its being controlled by connecting it to and disconnecting it from its D.C. power source.

A still further object is to provide a base drive circuit which, upon energization thereof, will insure oscillation of the network.

Another object is to provide an active source of potential other than that derived from the inverter network to insure an initiation of oscillation upon actuation of the starting device with a minimum of generated transients.

Other objects will be apparent from the specification, the appended claims and the drawings, in which drawings:

Figure 1:
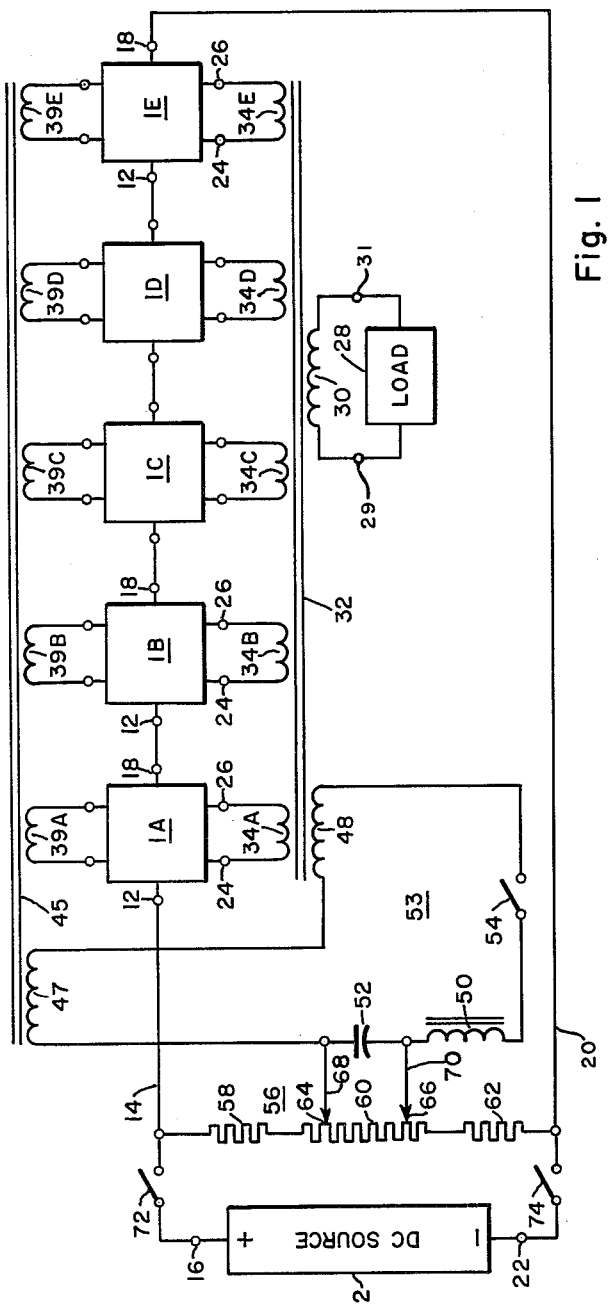
FIGURE 1 is a view partly schematic and partly in block form of an inverter assembly embodying the invention.

Referring to the drawings by characters of reference, the numeral 1 represents generally an inverter network of the bridge type for inverting unidirectional potential into alternating potential. Each of the networks 1A–1E includes a main power circuit having at least one transistor or switching means in each of its legs. The number of transistors in each leg will depend upon the voltage of the source 2 and the number of inverters. It will be apparent that the rated voltage of the transistors must not be exceeded and enough individual transistors must be series connected in each leg to support the voltage appearing across each inverter. Likewise, it will be apparent that the rated current carrying capacity of the transistors must not be exceeded and enough individual transistors must be paralleled together in each leg to achieve this result. This invention is not concerned with the ways in which transistors are serially or parallelly connected together in any individual network 1 nor is it concerned with any particular number of networks 1, the number thereof being solely determined by the voltage which is supportable across the individual network 1. For purposes of simplicity only a single transistor (4, 6, 8 and 10) is shown in each leg. Five networks 1A–1E are illustrated since that number was used in one of applicant's embodiments.

Each of the transistors 4, 6, 8 and 10 includes a main power circuit and a control circuit. The main power circuit of each transistor includes an emitter electrode $e$ and a collector electrode $c$ while the control circuit includes a base electrode $e$ and one of the emitter electrode $e$ or collector electrode $c$. In applicant's preferred embodiment, the control circuit is shown as including the emitter electrode $e$. While p-n-p transistors are illustrated, it will be apparent that n-p-n transistors could also be used without departing from the scope of the invention merely by changing the polarization of the circuit elements.

The emitters $e$ of the transistors 4 and 8 of each inverter are connected to its positive input terminal 12. The collectors $c$ of the transistors 6 and 10 of each inverter are connected to its negative input terminal 18. The networks 1A–1E have their input terminals serially connected between positive and negative supply conductors 14 and 20 which are respectively connected to the positive and negative terminals 16 and 22 of the source 2. The collector $c$ of transistor 4 and the emitter $e$ of the transistor 10 of each inverter are connected to its output terminal 24 of the bridge while collector $c$ of transistor 8 and emitter $e$ of transistor 6 of each inverter are connected to its output terminal 26. A voltage clamping capacitor 27 is provided between the input terminals 12 and 18 of each network 1 in accordance with the teachings in the copending application Serial No. 844,801, filed October 6, 1959, by Yin Min Wei, now abandoned, and assigned to the assignee of this application. The load 28 is connected to one secondary winding 30 of a power transformer 32, the primary windings 34A–34E of which are connected respectively between the output terminals 24 and 26. From the foregoing it will be apparent that each of the inverter networks 1 provides first and second electrical energy conducting paths connecting its input terminals 12 and 18 with its output terminals 24 and 26. Jointly the inverters 1 connect the input power terminals 16 and 22 with the power output terminals 29 and 31 to which the load 28 is connected.

The inverter circuit thus far described is conventional and comprises first and second energy conveying or power paths. The first power path includes a first power path portion connecting the terminal 12 through the emitter-collector or power circuit of transistor 8 to the terminal 26. The second power path portion of the first power path connects the terminal 18 with the terminal 24 and includes the emitter-collector or power circuit of the transistor 10. Likewise the second power path individually includes in its two portions the transistors 4 and 6. The power paths of the individual inverters jointly comprise the power paths of the total apparatus which connects the input terminals 16 and 22 with the output terminals 29 and 31, and is the portion of the inverter network through which the power flows from the source 2 to the load 28. The novelty of the network 1 lies in the base current controlling circuit by which the transistors 4, 6, 8 and 10 are controlled.

Each network 1 is provided with a control transformer 36 having a primary winding 38 and a plurality of secondary windings 40, 42, 44 and 46. The output terminals of the primary windings 38 are individually connected to secondary windings 39A–39E of a coupling transformer 45 the primary winding 47 of which is connected to a secondary winding 48 of the power transformer 32 through an inductive reactor 50 and a capacitive reactor 52 connected in series to provide an oscillating network 53. An on-off switch 54 is also provided in this circuit and acts to control the periods during which the inverter networks 1A–1E energize the load 28. The winding 40 is connected between the base $b$ and emitter $e$ of the transistor 4 through a resistor 41. Likewise, the base $b$ and emitter $e$ of the transistors 6, 8 and 10 are individually connected across the windings 42, 44 and 46 through the current limiting resistors. If desired, a single transformer could be utilized in place of the transformers 45 and 36A–36E with the windings 47. 40A–40E, 42A–42E, 44A–44E, and 46A–46E all on the same core.

In the control circuit thus far described the starting of oscillations would be erratic and may contain harmful transients upon closure of the switch 54 although once having started to oscillate, the network 1 would continue to oscillate as long as the switch 54 remained closed. When, however, an active source of potential is provided in the base drive circuit, closure of the switch 54 will result in a definite potential being established in the base circuits of the transistors and oscillation will be insured. In whichever direction this occurs, one set of transistors 4 and 6 or 8 and 10 will commence to conduct more than the other set. When this occurs, the conducting set of transistors causes a potential to be established at bridge terminals 24 and 26 and across the winding 48 of the transformer 32. The energization of the transformer 32 feeds a voltage into the base circuits and oscillation of the network commences as will be described in greater detail below.

While any convenient source of potential may be used to start an initial pulse in the winding 38, including an alternating potential as well as a unidirectional potential, by utilizing a precharged storage device such as a capacitor 52, a steeper wave front and more initial energy is available for inverter starting purposes than is usually otherwise available. I prefer to utilize a chargeable element such as the capacitive element 52 which, during the periods when the switch 54 is open, will become charged to a fixed polarity. As a suitable source of charging potential, I prefer to use a portion of the potential of the source 2. For this purpose I provide a voltage divider 56 comprising one or more resistors connected between the conductors 14 and 20. Three resistors 58, 60 and 62 are shown. The intermediate resistor 60 is provided with a pair of terminals 64 and 66 between which there exists a unidirectional potential for the charging the capacitor 52. The charging energy is supplied from the terminals 64 and 66 to the capacitor 52 by conductors 68 and 70.

In order to initiate operation of the inverter 1 with a minimum of transients, the terminals are preferably adjusted to charge the capacitor 52 to a potential equal to the potential to which the capacitor 52 is charged at current zero during oscillation of the network 53. Also, the inductive reactor 50 is designed to have a minimum of remnant flux when the current therethrough is zero. This may be done by the proper use of core material and/or the use of air gaps in the magnetic circuit. Under some conditions it may be desirable to use air core reactors. Under these conditions closure of the start switch 54 will initiate current flow in the network 53 in as nearly the same manner as if the network were in its oscillating condition. Preferably, the value of the resistors 58 and 62 are so selected that during oscillation of the network 53 the capacitor 52 is not substantially charged. Suitable values for the circuit elements would be as follows for an output voltage of 300 volts between the conductors 14 and 20:

Resistor 58 _____ 27,000 ohms.
Resistor 60 _____ 12,000 ohms.
Resistor 62 _____ 22,000 ohms.
Capacitor 52 _____ 2 mfd.
Reactor 50 _____ 5 millihenries.
Winding 48 _____ 60 volts 1500 c.p.s.
Winding 30 _____ 300 volts 1500 c.p.s.

The operation of the inverter apparatus is as follows: The apparatus is rendered effective and ineffective to energize the load 28 by closing and opening the start switch 54. In standby condition the bridge terminals 12 and 18 remain energized from the D.C. source 2. It will be appreciated that, if desired, disconnect switches 72 and 74 may be provided as shown to enable one to isolate the networks 1A–1E from the source 2 but these switches are not for the purpose of initiating or interrupting flow of power from the source 2 to the load 28. Switches 72 and 74 will be, therefore, normally maintained closed and the network 1 will be kept in standby or "ready" condition.

During standby, the capacitor 52 was charged through the conductors 68 and 70 from the voltage divider 56 preferably to the same magnitude as occurs at current zero during oscillation. Upon closure of the start switch 54, it discharges through the series circuit comprising winding 47, winding 48 and inductor 50. This causes a flux change in the transformer 45 which energizes the windings 39A–39E which windings in turn energize the transformers 36 and their windings 40, 42, 44 and 46. The windings 40 and 42 will be energized in a polarity to cause transistors 4 and 6 to conduct while the polarity of the windings 44 and 46 will be in a direction to keep the transistors 8 and 10 in their non-conducting condition. Conduction of the transistors 4 and 6 acts to increase further the flux change in the output transformer 32 thereby causing a further increase in energization of the circuit 53 and increased conduction of the transistors 4 and 6. The feedback process continues until transistors 4 and 6 are fully conductive and the transistors 8 and 10 are held non-conducting. This causes the bridge terminals 24 to be held positive with respect to bridge terminals 26 and current in a first direction continues to increase building up flux in one direction in the output transformer 32 thereby causing current to flow in a first direction through the load.

Eventually, the capacitor 52 becomes charged in the reverse polarity and the current through winding 38 ceases and then starts to flow in the reverse direction. This reverses the output polarity of the windings 40, 42, 44 and 46 whereby the transistors 8 and 10 are biased toward conduction and the transistors 4 and 6 are biased non-conductive. Reversal of conduction of the sets of transistors 4–6 and 8–10 makes the bridge terminals 26 positive with respect to terminals 24. Through feedback action as explained above transistors 8 and 10 are quickly rendered fully conductive and current builds up in a direction opposite to that described above with transistors 4 and 6 fully conductive and potential of the opposite polarity is supplied to the load 28.

It will be evident that as the relative polarity of the bridge terminals 24 and 26 alternates, the power transformer will be energized in alternating polarity and the load 28 will be energized with a potential which alternates at the oscillating frequency of the reactive elements 50 and 52.

Figure 2:
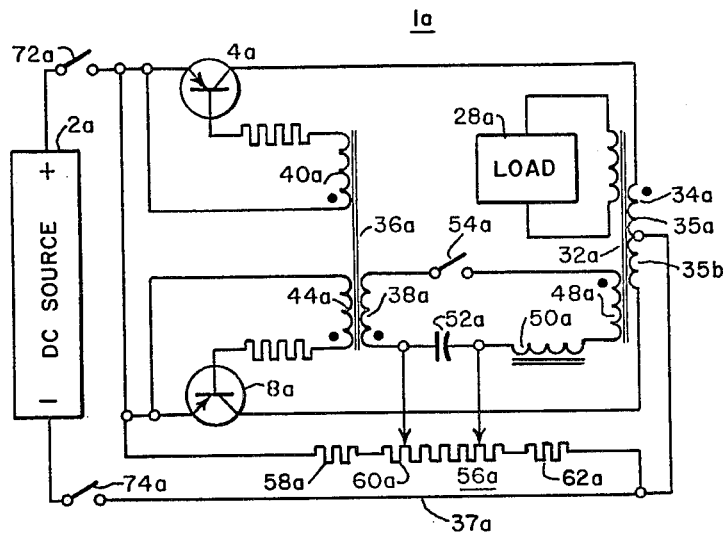
FIG. 2 is a schematic view of a modified form of the invention.

In FIG. 2 the unidirectional potential source 2a supplies alternating potential to the load 28a through power output transformer 32a and a pair of transistors 4a and 8a arranged in push-pull and having their base controlling circuits energized from a control transformer 36a energized from an output winding 48a of the power transformer 32a.

Figure 1A:
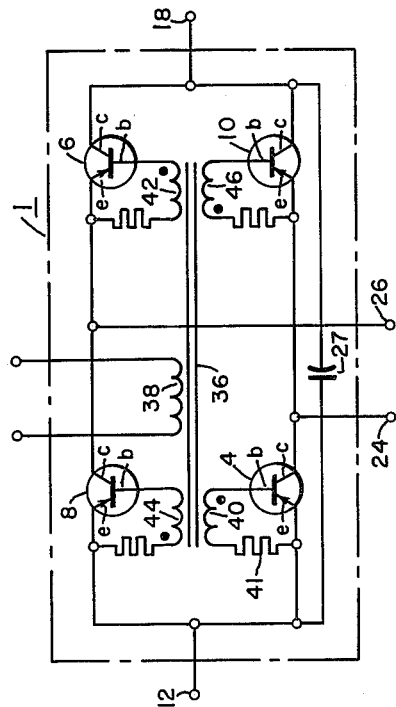
FIG. 1A is a schematic view of one of the inverters illustrated in block form in FIG. 1.

It is believed that the construction of FIG. 2 may best be understood by a description of its operation which is as follows: The inverter network 1a is placed in standby condition by closure of the switches 72a and 74a. Since, at this time the start switch 54a is open the control circuits of the transistors 4a and 8a will be de-energized and no substantial current will flow therethrough. The resistor 60a of the voltage divider 56a will, however, be energized and a charge will be placed on the capacitor 52a, as described above in connection with FIGURES 1 and 1A. When it is desired to energize the load, start switch 54a is closed. This causes a pulse of current to flow through the series circuit including the winding 38a of transformer 36a, winding 48a of transformer 32a, inductor 50a, and the capacitor 52a. The windings 40a and 44a become energized in the polarity indicated by the dots. Transistor 4a commences to conduct and transistor 8a is held non-conductive. Current then flows through the upper portion 35a of primary winding 34a and returns to the source 2a through the conductor 37a. The energization of the winding portion 35a causes an increased current to flow through winding 38a which results in a further increase in current flow through transistor 4a. This regenerative effect continues until transistor 4a is fully conducting.

At the end of a predetermined period of time, the capacitor 52a will reach its fully charged state and current flow through the winding 38a reverses thereby reversing the direction of the current flow through the winding 38a. The windings 40a and 44a are again energized but this time in opposite polarity and the transistor 8a is caused to conduct while the transistor 4a is held in its minimum conducting condition. Current now flows from the source 2a through the lower half 35b of the winding 34a. This causes a voltage to be generated in the winding 48a in opposite polarity to that described above and the regenerative effect continues as explained in connection with transistor 4a until transistor 8a is rendered fully conductive.

At the end of a time interval determined primarily by the relative magnitudes of the elements 50a and 52a current flow through the winding 38a will again reverse and transistor 8a will become non-conductive and transistor 4a will become conductive de-energizing the winding portion 35b and re-energizing the portion 35a. As in the case of the form of the invention shown in FIG. 1, alternating potential will be supplied to the load 28a at the frequency of oscillation of the elements 50a and 52a.

Figure 3:
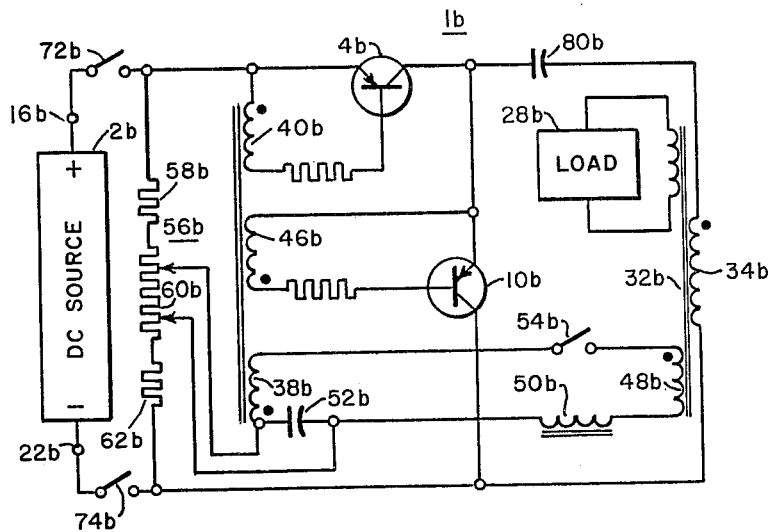
FIG. 3 is a schematic view of a further modified form of the invention.

In the form of the invention shown in FIG. 3, the inverter 1b is shown in a so-called L-circuit in which energy from the source 2b is supplied to the load 28b during alternate half cycles only. The energy for the opposite alternate half cycles is supplied to the load by the capacitor 80b connected in series with the primary winding 34b of the power transformer 32b.

It is again believed that the construction of FIG. 3 may best be understood by a description of its operation which is as follows: Closure of the disconnect switches 72b and 74b places the inverter network 1b in standby condition in which resistor 60b of the voltage divider 56b is energized. This, of course, causes the capacitor 52b to be charged as in the case of 52 and 52a of FIGS. 1 and 2. Closure of the start switch 54b causes the capacitor 52b to discharge through the series circuit which includes the winding 38b to induce a voltage in the base circuit energizing windings 40b and 46b. The polarity of these windings with respect to the winding 38b is such that winding 46b will tend to keep transistor 10b in minimum current conducting condition while winding 40b tends to cause an increase in conduction in the transistor 4b. Current then flows from the terminal 16b through transistor 4b, capacitor 80b, and winding 34b to the terminal 22b. This current flow acts regeneratively through the windings 48b and 38b to cause the transistor 4b to become fully conductive.

When capacitor 52b charges, current flow through the winding 38b reverses. This causes the windings 40b and 46b to reverse in polarity whereby the transistor 4b is placed in its minimum conducting state and the transistor 10b is caused to start to conduct. Conduction of the transistor 10b causes the capacitor 80b to start to discharge through the winding 34b causing the output potential of the winding 48b to reverse. In this manner, the transistor 10b is regeneratively rendered fully conductive. At the end of a predetermined time interval as determined by the relative magnitudes of the elements 50b and 52b, the direction of current flow through the winding 38b ceases and reverses. When this occurs the transistor 10b is rendered in its minimum current conducting condition and transistor 4b is caused to increase its conduction and the regenerative action above described continues until the transistor 4b is fully conductive. As before the oscillation in the circuit including the elements 50b and 52b causes alternate conduction of the transistors 4b and 10b to alternately charge and discharge the power capacitor through the power transformer winding 32b. This results in an alternating potential being supplied to the load 28b from the unidirectional potential source 2b.

It will be appreciated that my invention is usable in a wide variety of power circuits, three of which have been illustrated. While I have shown an oscillatory circuit including both capacitive and inductance reactance it will be apparent that in its more generic form it is applicable to a control circuit which omits the inductive element or the capacitative element. In its generic scope, the invention contemplates the precharging of an energy storage device in the base control circuit which energy is used as a consequence of the actuation of the starting device to provide the initial starting energy to insure operation of the apparatus. Further, other storage devices may be substituted for this illustrated capacitor.

The invention is to be limited only by the hereinafter appended claims taken in view of the prior art.

I claim as my invention:

1. In an inverter network, a pair of terminals adapted to be energized from a source of direct potential energy, a pair of load supplying terminals adapted to be connected to an alternating potential load, switching means having a main current circuit and an electrically energizable control circuit for controlling the initiation of current flow through its said main current circuit, an electrical energy conducting network connecting said pairs of terminals for flow of energy between said pairs of terminals and including said main current circuit of said switching means, conduction of said main current circuit of said switching means initiating energy flow through said energy conducting network, a pair of control-potential terminals, means coupling said control terminals to said energy conducting network for energization as a consequence of said energy flow through said energy conducting network, a self-oscillating oscillatory circuit including inductance and capacitance interconnected together for resonant flow of energy therebetween at a frequency primarily determined by said inductance and said capacitance, said oscillatory circuit having output connections which are pulsatingly energized at the frequency of said resonant flow of energy, means connecting said output connections to said control circuit of said switching means to initiate current flow in said main current circuit of said switching means to energize said load supplying terminals at the resonant frequency of said oscillatory circuit, means connecting said oscillatory circuit to said control-potential terminals for supplying energy thereto, and energy supplying means precharging at least a portion of said capacitance to a predetermined potential during the non-resonant condition of said oscillatory circuit, said precharging means being separate from said means which connects said oscillatory circuit to said control-potential terminals.

2. The combination of claim 1 in which said predetermined potential is substantially the same potential that appears across said capacitor at zero current flow during resonance of said oscillatory circuit.

3. The combination of claim 1 in which means is provided to prevent an effective supply of energy to said capacitance by said precharging means during resonance of said oscillatory circuit.

4. In an inverter network, a pair of input terminals adapted to be energized from a source of unidirectional electrical energy, a pair of output terminals adapted to be connected to a load, switch means having a power circuit and an electrically energized control circuit for rendering said power circuit conducting for the transmission of current through said power circuit, an energy conducting network connecting said input terminals to said output terminals for flow of energy between said pairs of terminals, said energy conducting network including said power circuit of said switch means, conduction of said power circuit initiating energy flow through said energy conducting network, a pair of control-potential terminals, means coupling said control terminals to said conducting network for energization as a consequence of current flow through said conducting network, an oscillating control network connected to said control-potential terminals, and including a self-resonating oscillatory circuit, said oscillatory circuit including in series a capacitor and an inductance and a switch, the resonating frequency of said oscillatory circuit being determined primarily by the magnitudes of said capacitance and said inductance means connecting said oscillating network to said control circuit of said switch means, said oscillating control network being effective when resonating to render said control circuit effective to initiate pulsating current flow through said power circuit and energy flow through said energy conducting network, and a charging circuit separate from said control-potential terminals and connected to said capacitor for precharging said capacitor, said charging circuit including current limiting and voltage limiting impedance devices connecting said capacitor across said input terminals, said voltage limiting impedance device being of such magnitude that the potential placed across said capacitor during the intervals in which said control network is not resonating is substantially equal to the potential appearing across said capacitor at zero current flow during resonance of said network, said current limiting device being so related to the magnitude of the capacitance of said capacitor and to the frequency of resonance of said control network that the charge imparted to said capacitor by the current through said impedance device during resonance is an insignificant part of the charge imparted to said capacitor during resonance of said control network.

References Cited by the Examiner

UNITED STATES PATENTS 2,843,744   7/1958   Guyton _____ 331—114 X
2,971,166   2/1961   Schultz _____ 331—113.1

ROY LAKE, *Primary Examiner*.